United States Patent
Smith et al.

(10) Patent No.: US 8,122,844 B2
(45) Date of Patent: Feb. 28, 2012

(54) FREEZE INDICATORS WITH A CONTROLLED TEMPERATURE RESPONSE

(75) Inventors: Dawn E. Smith, Martinsville, NJ (US); Carl M. Lentz, Cedar Knolls, NJ (US); Dene H. Taylor, New Hope, PA (US); Yvonne Osunga, Prospect Park, NJ (US); Brian Huffman, Belle Mead, NJ (US)

(73) Assignee: Temptime Corporation, Morris Plains, NJ (US)

( * ) Notice: Subject to any disclaimer, the term of this patent is extended or adjusted under 35 U.S.C. 154(b) by 24 days.

(21) Appl. No.: 12/871,034

(22) Filed: Aug. 30, 2010

(65) Prior Publication Data

US 2011/0209658 A1   Sep. 1, 2011

Related U.S. Application Data

(60) Provisional application No. 61/238,403, filed on Aug. 31, 2009.

(51) Int. Cl.
 *G01K 11/12* (2006.01)
 *G01K 11/16* (2006.01)
 *G01K 11/18* (2006.01)

(52) U.S. Cl. .................. 116/216; 374/106; 374/161

(58) Field of Classification Search .................. 116/207, 116/216, 217, 218, 219; 374/102, 106, 161, 374/162; 252/408.1
See application file for complete search history.

(56) References Cited

U.S. PATENT DOCUMENTS

| | | | |
|---|---|---|---|
| 4,148,748 A | 4/1979 | Hanlon et al. | |
| 4,191,125 A | 3/1980 | Johnson | |
| 5,137,815 A | 8/1992 | Hendricks | |
| 5,223,412 A | 6/1993 | Wight et al. | |
| 5,239,942 A | 8/1993 | Ignacio et al. | |
| 5,489,521 A | 2/1996 | So et al. | |
| 5,964,181 A | 10/1999 | Pereyra | |
| 6,472,214 B2 | 10/2002 | Patel | |
| 6,837,620 B2 | 1/2005 | Shahinpoor | |
| 6,957,623 B2 | 10/2005 | Guisinger | |
| 7,343,872 B2 | 3/2008 | Taylor et al. | |
| 7,490,575 B2 | 2/2009 | Taylor et al. | |
| 7,891,310 B2 * | 2/2011 | Taylor et al. | .................. 116/216 |
| 2008/0110391 A1 | 5/2008 | Taylor et al. | |
| 2008/0257251 A1 | 10/2008 | Taylor et al. | |
| 2009/0186209 A1 | 7/2009 | Padiyath et al. | |
| 2010/0020846 A1 * | 1/2010 | Kagan et al. | .................. 374/141 |
| 2010/0162941 A1 | 7/2010 | Lentz et al. | |

OTHER PUBLICATIONS

Turner et al., "Components of Ice Nucleation Structures of Bacteria", Journal of Bacteriology, Oct. 1991, vol. 173, No. 20, pp. 6515-6527.

(Continued)

*Primary Examiner* — Richard A. Smith
(74) *Attorney, Agent, or Firm* — K&L Gates LLP

(57) ABSTRACT

A freeze indicator can include an indicator dispersion having an aqueous liquid medium and organic material indicator particles dispersed in the aqueous liquid medium. The indicator dispersion can have an initial appearance before freezing and an irreversibly different appearance after freezing and can exhibit a freeze-onset temperature of about −1.9° C. or higher. Some factors helpful to providing a relatively high freeze onset temperature are employment of a proteinaceous ice-nucleating agent, control of pH, use of a protein stabilizer and control of the ratio of protein stabilizer to ice-nucleating agent.

29 Claims, 1 Drawing Sheet

OTHER PUBLICATIONS

Jung et al., "Expression of carboxymethylcellulase on the surface of *Escheirichia coli* using *Psuedomonas syringae* ice nucleation protein", Enzyme and Microbial Technology, 1998, vol. 22, pp. 348-354.

Vali, Ice Nucleation—Theory. A Tutorial. For Presentation at the NCAR/ASP 1999 Summer Colloquium, pp. 1-22, Jun. 25, 1999.

Freezing Points Table of Glycerine-Water Solutions, downloaded from the glycerine resources website for Dow Chemical Company on Aug. 26, 2009.

Wolber, et al., "Identification and purification of a bacterial ice-necleation protein", Proc. Natl. Acac. Sci USA, vol. 83, pp. 7256-7260, Oct. 1986.

"Snomax" home webpage, Johnson Controls Inc., Downloaded on Jul. 31, 2009.

"Snomax FAQ's" webpage, Johnson Controls, Inc.

* cited by examiner

FREEZE INDICATORS WITH A CONTROLLED TEMPERATURE RESPONSE

CROSS-REFERENCE TO A RELATED APPLICATION

This application claims the benefit of provisional patent Application No. 61/238,403 filed on Aug. 31, 2009, the disclosure of which is incorporated by reference herein.

STATEMENT REGARDING FEDERALLY SPONSORED RESEARCH OR DEVELOPMENT (Not applicable.)

The present invention relates, inter alia, to freeze indicators comprising dispersions of organic material indicator particles in an aqueous liquid medium. More particularly, but not exclusively, the invention relates to freeze indicators which can provide a reliable indication of the past exposure of a host product to a temperature which is about, or below, the freezing point of water or another liquid. The invention includes a freeze-sensitive host product having a freeze indicator embodiment of the invention associated with the host product to monitor possible freeze exposure.

BACKGROUND OF THE INVENTION

Many commercial products are temperature sensitive and can spoil, deteriorate or lose quality if they suffer even brief exposure to a temperature near or below freezing. For example, fruits may turn brown, flowers, salad greens and some herbs may wilt and vaccines may lose potency. Some other freeze-sensitive products include pharmaceutical products, medications, blood products, and health care products containing freeze-sensitive products such as natural, synthetic or recombinant proteins and polypeptides, as well as foodstuffs, beverages, and some industrial products, for example emulsions, and latex paints. Some products can suffer a loss of quality owing to exposure to an unduly cold temperature, without exhibiting any clear change in appearance.

To help monitor the possible presence of such invisible, or hidden, loss of quality, low-cost freeze indicators can be employed. One useful freeze indicator can provide an irreversible indication of past exposure of the host product to freezing or near freezing temperatures and can be associated with a freeze-sensitive host product, for example by attaching the freeze indicator to the host product.

Various proposals for such freeze indicators are known. For example, U.S. Pat. Nos. 7,343,872 and 7,490,575 and U.S. Patent Application Publications Nos. 2008/0110391 and 2008/0257251, all having inventors Taylor et al., disclose a variety of freeze indicators and freeze indicator technologies. These patents and patent application publications are referenced herein as the "Taylor et al. patent publications". U.S. Patent Application Publication No. US 2010/0162941, to Lentz et al. also discloses a variety of freeze indicators and freeze indicator technologies. Each of the Taylor et al. patent publications and the Lentz et al. application are incorporated by reference herein.

As described in their specifications the Taylor et al. patent publications and the Lentz et al. application disclose freeze indicators which employ an indicator element comprising a dispersion of solid particles in a liquid medium. The indicator element can change appearance irreversibly upon exposure to freezing temperatures, for example as a result of coagulation of the dispersed solid particles, providing a signal that the freeze indicator has been exposed to a freezing temperature.

Furthermore, U.S. Pat. No. 6,957,623 to Guisinger describes a critical temperature indicator which produces a visual, irreversible indication that the indicator has been exposed to a critical temperature such as a temperature near the freezing point of water. As described in its specification, Guisinger's critical temperature indicator includes a transformable material including a mixture of water, a nucleating agent, latex, and a stabilizer for the nucleating agent. Also as described, the latex can be a wax, the nucleating agent can be an ice nucleating active (INA) microorganism and the water can comprise deuterium oxide.

Notwithstanding the foregoing proposals for freeze indicators it would be desirable to have a freeze indicator having enhanced response characteristics.

BRIEF SUMMARY OF THE INVENTION

A difficulty with freeze indicators whose response relates to the freezing of an aqueous medium is that the freezing point of the aqueous medium may be unduly depressed by supercooling or other phenomena. An economical freeze indicator which overcomes this problem would be useful for some purposes.

The present invention provides, inter alia, a freeze indicator having new or improved temperature response characteristics.

The present invention can also provide a freeze indicator having an aqueous liquid medium, which freeze indicator exhibits a relatively high freeze onset temperature.

Furthermore, the present invention can provide a freeze indicator having an aqueous liquid medium, which freeze indicator exhibits a relatively high freeze onset temperature after a week or more of storage at room temperature.

In addition, freeze indicators according to the invention can employ relatively low-cost ingredients, thereby contributing to an economy of manufacture.

Accordingly, in one aspect, the invention provides a freeze indicator including an indicator dispersion, which dispersion comprises an aqueous liquid medium and organic indicator particles dispersed in the aqueous liquid medium. The aqueous liquid medium has a melting temperature and a freezing temperature, the freezing temperature being below the melting temperature. Also, the indicator dispersion has an initial appearance before freezing and an irreversibly different appearance after freezing. The freeze indicator can exhibit an improved freeze-onset temperature, for example a freeze onset temperature of about −1.9° C. or higher.

The freeze-related response temperature can be a freeze onset temperature. Usefully, the freeze indicator can exhibit a distinct appearance change indicative of freezing of the liquid medium at the freeze onset temperature.

The invention includes embodiments wherein the freeze indicator can exhibit a freeze-related response at a temperature of at least −1° C., or of at least −0.5° C. For example, some embodiments of the freeze indicator can exhibit a freeze-related response at a temperature of about 0.0° C.

In another aspect the invention provides a freeze indicator which can exhibit, after at least four weeks of storage at a room temperature of about 20° C. to about 25° C., a freeze-onset temperature of at least about −2.0° C., at least about −1.5° C. Alternatively, the freeze onset temperature after such storage can be not more than 0.5° C. lower than the freeze onset temperature of the freeze indicator when dispersion is freshly made.

In a still further aspect, the invention provides a freeze indicator including an indicator dispersion, which freeze indicator comprises an aqueous liquid medium and organic indicator particles dispersed in the aqueous liquid medium. The aqueous liquid medium has a melting temperature and a freezing temperature below the melting temperature. In this aspect, the freeze indicator can further comprise a proteinaceous ice-nucleating agent to elevate the freezing temperature. The freeze indicator can also include a nucleating agent stabilizer to stabilize the nucleating agent, for example against thermal degradation induced by elevated temperatures to which the freeze indicator may be exposed. Desirably, the indicator dispersion can have an initial appearance before freezing and an irreversibly different appearance after freezing.

The freeze indicator can comprise any suitable quantity of proteinaceous ice-nucleating agent, for example a weight of from about 1 μg to about 2 mg. If desired, the freeze indicator can also comprise a suitable concentration of stabilizer for the ice-nucleating agent, for example, from about 0.05 percent to about 5 percent by weight, based on the weight of the indicator dispersion.

Furthermore, the aqueous liquid medium can have a pH in the range of from about pH 4 to about pH 11. For example, the aqueous liquid medium can have a pH in the range of from about pH 7.5 to about pH 8.5.

In yet another aspect, the invention provides a freeze indicator including an indicator dispersion which comprises an aqueous liquid medium and organic indicator particles dispersed in the aqueous liquid medium. The aqueous liquid medium has a melting temperature and a freezing temperature below the melting temperature. Desirably, the indicator dispersion can have an initial appearance before freezing and an irreversibly different appearance after freezing. And the liquid medium can have a pH in the range of from about pH 7 to about pH 9.

The invention can include a host product comprising a freeze indicator according to the invention wherein the freeze indicator is associated with the host product, for example by being attached to the host product or to a container or packaging for the host product.

BRIEF DESCRIPTION OF THE SEVERAL VIEWS OF THE DRAWING

Some embodiments of the invention, and ways of making and of using one or more embodiments of the invention, are described in detail herein and by way of example, with reference to the accompanying drawings (which are not necessarily drawn to scale with regard to any internal or external structures shown) and in which like reference characters designate like elements throughout the several views, and in which.

DETAILED DESCRIPTION OF THE INVENTION

Figure 1:
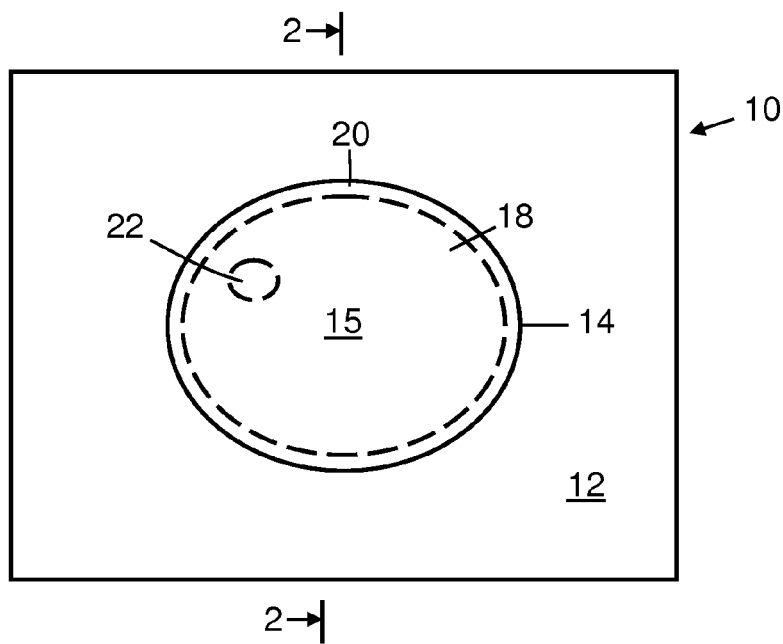
FIG. 1 is a plan view of an illustrative embodiment of a freeze indicator according to the invention.

For some purposes, it would be desirable to have a freeze indicator employing an aqueous freeze indicator medium which exhibits a relatively elevated freeze onset temperature.

Furthermore, in some cases, it would be desirable to have a freeze indicator which is capable of exhibiting a relatively elevated freeze onset temperature after a period of storage.

Known freeze indicators employing a dispersion of indicator particles in an aqueous medium and which respond to the freezing of the aqueous medium, often have a freeze onset temperature which is upwardly limited by supercooling, by the composition of the indicator dispersion and by other factors. The freeze onset temperature may be slightly or significantly below the melting point of the liquid medium, when frozen, and may thus be significantly lower than is desirable for certain commercial applications.

The terms "water" and "aqueous" are used in this specification, unless the context indicates otherwise, to include not only water in which the principle hydrogen isotope present is protium, but also deuterium oxide, $D_2O$, or heavy water, partially deuterated water, DHO and mixtures of these forms of water. Where it is desired to distinguish between different forms of water, the term "light water" is used to refer to common, ordinary water in which the predominant hydrogen isotope present is protium. Traces of deuterium may be present in light water, as is well known.

Although frozen light water (ice), melts at 0° C., like a number of liquids, relatively pure light water may freeze at a temperature significantly below its melting temperature, for example at a temperature as low as −10° C., or even lower, a phenomenon known as supercooling. Also, while frozen deuterium oxide melts at a higher temperature than light water, namely at about 3.8° C., like light water, deuterium oxide freezes at a significantly lower temperature than its melting temperature, as a result of supercooling.

Ice nucleating agents can be added to aqueous dispersions to reduce the degree of supercooling, elevate the freezing temperature and narrow the range between the melting point and the freezing point. However, even the use of a nucleating agent may not provide a desirably high freeze onset temperature.

Thus, difficulty can occur in providing freeze indicators employing a dispersion of indicator particles in water which have a sufficiently high freezing or freeze onset temperature. The invention provides freeze indicators which can overcome or mitigate such difficulties.

Toward this end, the present invention provides, inter alia, a freeze indicator comprising a dispersion of indicator particles in an aqueous medium, which changes appearance irreversibly in response to freezing of the aqueous medium, possibly after thawing of the frozen aqueous medium, and which exhibits a freeze onset temperature above −2° C. For example, the freeze onset temperature can be about −1.9° C. or higher, or about −1° C. or higher, or about −0.5° C. or higher, or about 0.5° C. or higher. Usefully, the freeze onset temperature can be in the range of from about −0.9° C. to about 0° C.

The term "freeze onset temperature" is used herein to refer to the highest temperature at which a freeze indicator dispersion exhibits a detectable freeze-induced appearance change that can be unmistakably determined by visual observation. The appearance change can be a change from clear to opaque, the formation of ice crystals, or clouding.

Some embodiments of freeze indicator according to the invention can exhibit an unmistakable freeze-induced appearance change in a relatively short period of time, for example within 1 hour of exposure to the freeze onset temperature, or a lower temperature. The invention also includes mass-produced freeze indicators that yield an unmistakable freeze-induced appearance change, consistently and reliably, from one sample to the next, after exposure for shorter time periods, for example, 15 minutes, or 5 minutes, or another period under about 30 minutes.

The present invention also provides freeze indicators having an elevated freeze onset temperature or one or more other desirable characteristics, as described herein, which can respond reliably to freeze exposure. The term "reliably" is employed in this context to indicate that in a batch of similar freeze indicators subjected to similar conditions a significant proportion responds in the same way at about the same time. The significant proportion can be any appropriate proportion, for example, seventy percent, ninety percent, ninety five percent or even one hundred percent of a batch of freeze indicators.

Surprisingly, it has been discovered, pursuant to the invention that the freeze onset temperature of freeze indicators comprising an aqueous dispersion of indicator particles can be sensitive to formulation pH.

Pursuant to the invention, it has also been discovered, inter alia, that freeze indicators comprising an aqueous dispersion of indicator particles when formulated with a pH at or near 8.0, for example in the range of from about 7.8 to 8.2 referring to the pH of the liquid medium, can exhibit a surprisingly high freeze onset temperature.

References made to pH values herein are to be understood to refer to the pH of the freeze indicator dispersion (sometimes "formulation"), determined on the liquid medium in the freeze indicator dispersion, unless the context indicates otherwise. For example, reference is also made to the pH of wax dispersions employable in freeze indicator embodiments of the invention.

Also, an aspect of the present invention provides a freeze indicator comprising an aqueous dispersion of indicator particles that has a freeze onset temperature approaching or near to 0° C., independently of the pH of the aqueous medium employed.

Another aspect the invention provides a useful embodiment of freeze indicator employing a combination of a pH in the range of about 4 to about 9.5 with a formulation of the freeze indicator dispersion that in testing across a number of samples can exhibit freeze onset, reliably, at or above a temperature of −1° C. Another formulation can exhibit freeze onset, reliably, at or above a temperature of at or near 0° C.

The term "solid" is used herein to include "semi-solid" except where the context indicates otherwise.

The terms "coagulate", "coagulating" and "coagulation" are used in this specification to include aggregating, agglomerating, flocculating and other appearance-changing phenomena that can be exhibited by a liquid dispersion of indicator particles upon freezing, or upon freezing and thawing.

To signal past exposure to a freezing temperature, freeze indicators according to the invention usefully can have one visual appearance before freezing and a different visual appearance after the indicator has frozen. This appearance change can be provided by coagulation of indicator particles in the dispersion and desirably is irreversible.

Pursuant to the invention, it can be understood that solid particles dispersed in a liquid medium generally are not structurally incorporated into the growing crystals of the liquid medium as it freezes, so that the concentration of the solids in the residual liquid increases as the crystals grow, and the volume of unfrozen liquid decreases, bringing about coagulation.

Freeze indicator particles employed in practicing the invention can comprise solid or liquid particles of an organic material, for example a hydrophobic organic material which is insoluble in water. As is further described herein, the organic material can comprises one or more waxes and optionally, a wax softener blended with the one or more waxes to soften the waxy material.

Thus some useful examples of freeze indicator according to the invention comprise organic indicator particles dispersed in an aqueous liquid medium to provide an indicator dispersion wherein the dispersed indicator particles can coagulate to provide an irreversible change in visual appearance in response to freezing of the indicator dispersion.

Usefully, a proteinaceous particulate nucleating agent can be included in the indicator dispersion. A proteinaceous particulate nucleating agent can help elevate the freeze response temperature. If desired, the freeze indicator dispersion can include a stabilizer to stabilize the ice-nucleating agent.

With advantage, in freeze indicators according to the invention, the aqueous liquid medium can, if desired, have a pH in a range selected to help provide an elevated freeze response temperature. For example, the pH range can be selected from the group of ranges consisting of from about pH 4 to about pH 11; from about pH 4 to about pH 9.5; from about pH 7.5 to about pH 8.5; and from about pH 7.8 to about pH 8.2.

Also, freeze indicators according to the invention can comprise, if desired, an indicator volume containing the indicator dispersion and a polymeric film member, or members, defining the indicator volume. The polymeric film member can be located adjacent to the indicator dispersion and can have an outer surface exposed to the ambient environment of the freeze indicator.

In addition, freeze indicators according to the invention can comprise, if desired, a viewing window for viewing the indicator dispersion and an attachment device for securing the indicator to a host product to be monitored for possible freeze exposure. Optionally, such a freeze indicator can comprise a substrate layer including the attachment device, a viewing layer including the viewing window and a moisture vapor-tight seal between the substrate layer and the viewing layer wherein the indicator volume is defined between the substrate layer and the viewing layer and wherein the vapor-tight seal extends in a closed loop entirely around the indicator volume.

Furthermore, freeze indicators according to the invention can comprise, if desired, a reference area proximate to the indicator volume and the reference area can have an appearance similar to the appearance of an end point of the freeze indicator.

As stated, the indication of past exposure to freezing can be irreversible so as to give the freeze exposure signal provided by the freeze indicator some permanency. For example, the change in visual appearance can be incapable of being removed by shaking, thawing or heating to normal room temperature or to another non-destructive temperature. Such characteristics can permit freeze indicators according to the invention to be usefully employed with a wide range of products including pharmaceutical products, medical products, foodstuffs, and certain industrial products.

Desirably, freeze indicator embodiments of the invention can have a post-freezing visual appearance which is different from the initial, unfrozen appearance of the freeze indicator and the difference in appearance is irreversible. For example, after once having been frozen, the appearance of the freeze indicator can be permanently different from the initial appearance regardless of whether the freeze indicator has thawed or not. Possibly, the frozen and thawed appearances may be different from each other. Preferably, both the frozen and thawed appearances are distinctly different from the initial appearance. However, the invention also includes embodiments wherein the frozen appearance is similar to the initial appearance, and the thawed appearance is irreversibly different from either the initial or the frozen appearance.

The appearance of a freeze indicator according to the invention can provide a viewer, or an optical device, looking at the freeze indicator, with an irreversible indication, or signal, of past freeze exposure. Irreversibility of the signal can enable a viewer to determine whether the freeze indicator has ever been exposed to a freezing event, notwithstanding that the freeze indicator medium may subsequently have thawed and regained the liquid state. The freeze indicator signal can be read or captured by an optical device, for example, a camera, if desired.

The viewer's interpretation of the indicator signal can be assisted, if desired, by providing one or more reference areas adjacent the freeze indicator's active area with which the viewer can compare the appearance of the freeze indicator. The reference area can help the viewer judge the meaning of the appearance of the freeze indicator, for example to determine whether the appearance indicates "never frozen" or "has been frozen".

Freeze indicators according to the invention can be associated with a host product, for example a freeze-sensitive or freeze-perishable product, to monitor the host product, and, optionally, to suggest that the host product may also have suffered potentially deleterious freeze exposure.

Liquid Medium. The term "liquid medium" is used herein to refer to ingredients of a freeze indicator dispersion according to the invention which are liquid at a room temperature of 20° C. The liquid medium can be any suitable liquid medium, which is immiscible with, and not a solvent, for the organic indictor particles, for example, an aqueous liquid medium.

Desirably, the aqueous liquid medium can comprise at least about 10 percent, based on the weight of the liquid medium, of deuterium oxide, deuterated water or of a mixture of deuterium oxide and deuterated water. Higher proportions of deuterium oxide can be employed, for example at least about 50 percent, at least about 90 percent, at least about 95 percent, at least about 98 percent, at least about 99 percent, or approximately 100 percent by weight deuterium oxide, if desired. The freezing and melting points of protium oxide/deuterium oxide mixtures are generally related to the relative proportion of the two compounds, protium oxide having a melting point of 0.0° C. and deuterium oxide of 3.8° C.

If desired, the liquid medium can consist essentially of, or consist entirely of water, for example, the liquid medium can consist entirely of deuterium oxide, i.e. be 100 percent deuterium oxide, or can be a mixture of deuterium oxide and light water.

If desired, the aqueous liquid medium can be devoid, or free, of any organic liquid capable of separating from the liquid medium at a temperature in the range of likely ambient temperatures to which the freeze indicator is expected to be exposed, for example, a temperature in the range of from about −10° C. to about −50° C.

Proteinaceous Ice Nucleating Agent. Any suitable proteinaceous ice nucleating agent can be employed in embodiments of freeze indicator according to the invention, if desired.

For example, the proteinaceous ice-nucleating agent, if employed, can comprise a cell-free proteinaceous ice nucleating agent, or a whole-cell proteinaceous ice nucleating agent obtained from a microorganism selected from the group consisting of *Pseudomonas* species, *Pseudomonas syringae*, strains of *Pseudomonas syringae*, strains of *Pseudomonas syringae* as described in U.S. Pat. No. 5,489,521 to So et al., *Pseudomonas fluorescens*, *Pseudomonas coronafaciens*, *Pseudomonas pisi*, *Erwinia* species, *Erwinia ananas*, *Erwinia herbicola*, *Escherichia coil*, *Xanthomonas*, ice-nucleating fungi and ice-nucleating protozoa. Cell-free proteinaceous ice nucleating agents for use in the practice of the invention can be prepared from suitable ice-nucleating microorganisms by any suitable method, for example as described in U.S. Pat. No. 5,223,412 to Wight et al.

One microorganism-derived ice-nucleating material that is suitable for use in the practice of the invention is SNOMAX (trademark) snow inducer, a proteinaceous material available from Johnson Controls Inc., Milwaukee Wis., www.johnsoncontrols.com. As described by the supplier, an average composition of SNOMAX snow inducer comprises about 54 percent by weight of protein, including ice-nucleating protein, which protein material is derived from the bacterium *Pseudomonas syringae*. Further information about SNOMAX snow inducer can be found in "Snomax FAQ's", which document is available from www.johnsoncontrols.com and is incorporated by reference herein.

While the present invention is not bound by any particular theory, at the date of this application it appears to be understood in the art that the ice nucleating properties of the bacterium *Pseudomonas syringae*, or the commercial freeze-dried form of the bacterium supplied under the trademark SNOMAX, are attributable to a particular ice-nucleating protein. This protein, known as "ice-nucleating protein InaZ", is described in the art as the expression product of the InaZ gene of *P. syringae* and is believed to be located on the outer cell membrane of the bacterium. The ice-nucleating protein is believed to have water-binding functional groups spaced at multiples of the spacing that water molecules have in ice and to provide some innate nucleation ability. The freezing point of ambient water is believed also to be increased by aggregation of the ice-nucleating protein molecules in aligned arrays, sometimes known as "crystallites", approximately in the plane of the surface of the membrane. Disruption or degradation of the molecular array is believed to cause loss of nucleation effectiveness.

The ice-nucleating protein InaZ is apparently understood in the art to be a monomeric protein composed of more than 1200 amino acid residues with a deduced molecular weight of about 118 kDa. The amino acid residues of the N-terminal region are believed to interact with the phospholipid moieties in the outer membrane of the bacterial cell. The central region of the ice-nucleating protein is believed to comprise a series of repeated amino acid sequences having lengths of 8, 16, and 48 residues which act as templates for ice crystal formation. The C-terminal region is hydrophilic and exposed at the outermost cell surface. Such structure of the ice nucleating protein is further described in Jung, H-C et al, *Enzyme Microb. Technol.* 1998, 22: 348-354, the disclosure of which is incorporated by reference herein.

Proteinaceous ice-nucleating agents useful in the practice of the invention include natural, synthetic and recombinant polypeptides having an amino acid sequence including or consisting of a region homologous with, or analogous to, the ice crystal template region of the ice-nucleating protein InaZ and providing ice-nucleating functionality.

Protein Stabilizer. Proteinaceous materials may be sensitive to, and adversely affected by, normal ambient temperatures encountered in the storage and distribution of some host products that can be monitored for freeze exposure. Warm summer weather, hot climates and other ambient conditions can cause degradation of proteins and may cause a proteinaceous ice-nucleating agent to lose some or all of its effectiveness.

Furthermore, mixtures that contain proteinaceous materials and which are not sterile can permit microbiological activity which can also adversely reduce the effectiveness of the proteinaceous ice-nucleating material.

Accordingly, freeze indicator dispersions according to the invention that employ a proteinaceous ice-nucleating agent can also include a stabilizer to stabilize the ice-nucleating agent against thermal or other degradation, if desired.

Some examples of suitable stabilizers that can be employed in the practice of the invention include formaldehyde, dialdehydes, dialdehydes having no more than ten carbon atoms, glyoxal, glutaraldehyde ($CHO.CH_2CH_2CH_2.CHO$), adipaldehyde, guanidine hydrochloride, malonaldehyde, succinaldehyde, and terephthalaldehyde. Some other suitable stabilizers include various crosslinkers, for example, thiol-specific crosslinkers such as dibromoacetone or bismaleimidohexane, and amino-specific crosslinkers such as isocyanates and isothiocyanates.

Other suitable stabilizers that can be employed in the practice of the invention will be known or apparent to a person of ordinary skill in the art, in light of this disclosure, or will become known or apparent in the future, as the art develops. For example, materials that chemically hold or fix the three-dimensional molecular structure of the ice-nucleating protein so that the protein can better retain its conformation over time and/or at elevated temperature, can also be employed. Some such materials include crosslinking agents, multifunctional and bifunctional reagents, of which glutaraldehyde is but one example. Crosslinking can stabilize the tertiary structure and any aggregates. Mutually compatible mixtures of any of the foregoing stabilizers can also be employed. Desirably, the stabilizer selected and the concentration employed can be such as to avoid interfering with the ice-nucleating function of the proteinaceous material or any other functional aspect of the freeze indicator.

Further ingredients that can be optionally included in the freeze indicator dispersion will be known or apparent to a person of ordinary skill in the art, in light of this disclosure, or will become known or apparent in the future, as the art develops, and include for example biocides. In some cases, biocides can control potential microbial activity which can adversely effect the performance of an ice-nucleating protein, if employed. Some suitable protein stabilizers are also useful as biocides, for example glyoxal and glutaraldehyde.

Indicator Particles. Freeze indicator dispersions employed in freeze indicator embodiments of the invention can comprise any suitable freeze indicator particles to provide a visual signal of freeze onset. Desirably, the freeze indicator particles can provide a distinct appearance change, or other visual signal, in response to freezing, for example by coagulating.

Desirably also, the freeze indicator particles can be formed of a material that is nontoxic, biocompatible and economical. Some useful freeze indicator particles comprise particles of solid, semi-solid, or liquid organic materials that are insoluble in water, for example hydrophobic organic materials.

Suitable organic indicator materials include certain waxes, some polymeric material and particulate materials employed in latexes as well as other organic materials as will be apparent to a person of ordinary skill in the art. Some examples of suitable organic particulate materials include natural and synthetic rubbers, synthetic polymers such as styrene, vinyl and vinylidene polymers and copolymers, and waxes. The term "latex" is used herein to include dispersions of solid organic particles in aqueous or other liquid media which optionally have been prepared by emulsification. Some useful latexes are transparent or translucent and others have a milky appearance. Some latexes useful in the practice of the invention can include a surface-active agent or surfactant to stabilize the dispersion.

The invention can employ latex indicator dispersions which are initially translucent and become opaque, or display another distinctive appearance change after freezing. Alternatively, a useful latex indicator dispersion can be initially opaque and can coagulate upon freezing to provide, possibly after thawing, transparent regions of the dispersion through which a colored or other distinctive background can be viewed.

Some examples of waxes or waxy materials that are suitable for use as organic indicator particle materials in freeze indicators according to the invention include waxy materials such as paraffin wax, microcrystalline wax, carnauba wax, beeswax, Chinese wax, shellac wax, spermaceti, tallow, palm wax, soy wax, lanolin, wool grease, waxy polymers, waxy copolymers, polyolefins, polyethylenes, polypropylenes, ethylene copolymers, ethylene-vinyl acetate copolymers, vinyl ester polymers, vinyl acetate polymer, copolymers of ethylene with acrylic compounds, copolymers of ethylene with acrylic acid, and mixtures of any two or more of the foregoing waxy materials, including mixtures of vinyl esters and acrylic materials. Other suitable waxes or waxy materials will be known or apparent to a person of ordinary skill in the art, in light of this disclosure, or will become known or apparent in the future, as the art develops.

Waxes having a melting point in a suitable range, for example in the range of from about 40° C. to about 80° C., or in another suitable range, for example from about 0° C. to about 100° C. can be employed as the organic indicator material if desired. Desirably, the wax is solid in the frozen state of the liquid medium, or is solid at room and ambient temperatures as well as in the frozen state of the medium. Alternatively, or additionally, suitable waxes can have a softness indicated by penetration data characteristics. For example, indicator particles formed of organic material can have a softness of at least about 20 dmm or at least about 30 dmm. Materials with other appropriate softnesses, for example a softness of at least about 10 dmm, or with appropriate softnesses determined by another test, can be employed, as will be apparent to a person of ordinary skill in the art. The softnesses described herein are intended to be determined according to the ASTM D1321 Needle Penetration Test at 25° C.

The term "wax" is used herein to include paraffin waxes, sometimes known as "paraffins". Waxes suitable for employment in the practice of the invention include, without limitation, individual, mixed and blended hydrocarbons that are solid at room temperature, such waxes can be crystalline or microcrystalline.

Although the invention is not intended to be limited by any particular theory, it is believed that appropriate choice of a wax, a wax blend, and, possibly, a wax blend ratio, can help provide a desired appearance change. Waxes and wax blends that are soft may coagulate more readily than hard waxes or wax blends. Also, waxes, or other organic materials, having some polar functionality are believed to facilitate coagulation of the indicator particles into a mass that retains water and has good opacity characteristics. It will be understood that the presence of large masses, bodies, or agglomerations of indicator particles that have good opacity, in the post-freezing condition of a freeze indicator according to the invention can help provide a post-freezing appearance of the indicator which is clearly distinguished from the pre-freezing appearance. A clear difference between the before-freezing and after-freezing appearances can help a viewer, or a viewing device, read the indicator accurately.

Employing relatively simple, well defined, economic and readily available organic particulate materials, such for example as the waxes and certain of the hydrophobic polymers described herein, can be helpful in the mass production of freeze indicator embodiments of the invention. Use of such waxes and polymers can facilitate quality control, consistency and economy of the product.

If desired, a softener for the organic particulate material can be blended in with the organic material, to enhance the freeze indicator appearance change, or for another useful purpose. As is described and claimed in US 2010/0162941, the softener can be blended or otherwise intimately admixed with the organic material, if desired, to provide homogenous particles of solid material dispersed in the liquid medium. Upon freezing, the relatively soft particles can coagulate irreversibly into clumps or aggregates that can lend the indicator dispersions a distinctly different appearance after freezing from the initial appearance, before freezing.

The use of a softener according to the invention can enable an enhanced indicator appearance to be obtained. For example, after freezing some embodiments of softened solid organic particles can be coagulated into several large masses, or a single mass, of relatively high opacity, compared with the opacity of the indicator dispersion before freezing. Such a high opacity mass or masses of coagulated particles can provide a strong visual signal by obscuring a suitable background for example a white or light-colored, reflective, background or a background bearing a pattern, an image or a graphic, a check mark or words or other desired appearance.

Employing a wax softener, or a plasticizer or the like, pursuant to the invention can enable an enhanced indicator appearance to be obtained without employing dyes or pigments which could leach into the dispersion medium and interfere with the visual response to freezing. However, some embodiments of the invention can employ one or more dyes and/or pigments or other colorants, if desired. A softener for the wax indicator material, if employed, can be selected from the group consisting of ethylene copolymers, microcrystalline waxes, polyethylene, cholesterol, short-chain alkanes, paraffinic oil, naphthenic oil, aromatic oil, glycerol, mineral oil, a fatty acid, a fatty-acid derivative, a fatty alcohol, a fatty acid ester, a hydrogenated and partially hydrogenated fatty acid, a hydrophilic softener and a hydrophilic long-chain hydrocarbon comprising at least one ester group. The softener can also be a suitable plasticizer.

Freeze indicators according to the invention can comprise a proportion of the softener of from about 5 to about 50 percent by weight or of from about 20 to about 30 percent by weight, both ranges of proportions of softener being based upon the combined weights of the softener and the organic material.

Various other organic materials can be employed for the indicator material, as an alternative to, or in admixture with, the organic materials already described herein. For example, the organic indicator material can comprise a soft solid or a semi-solid material selected from the group consisting of rubbery polymers, styrene-butadiene latex, natural rubber latex, rubbery polyurethane, rubbery acrylic polymers and copolymers, rubbery nitrile polymers and copolymers, rubbery polychloroprene, rubbery vinyl pyridine polymers, rubbery styrene polymers, rubbery styrene/butadiene copolymers, rubbery styrene/acrylic acid copolymers, rubbery vinyltoluene/tertiarybutyl styrene copolymers, rubbery vinylidene chloride/vinyl chloride copolymers and mixtures of two or more of the foregoing polymeric materials.

The term "rubbery" is used herein to include materials resembling natural rubber, resilient materials and elastomeric materials.

If desired, the organic indicator material can have a glass transition temperature below about 20° C. or below the liquid medium frozen state melting point.

Alternatively, the organic indicator material can have a glass transition temperature above about 20° C. If desired, the organic material softener can comprise a plasticizer.

The organic indicator material can also comprise a mixture of crystalline and non-crystalline materials, for example a suitable wax and a suitable rubbery polymer such as are described herein.

Also, the organic indicator material particles can be liquid, if desired, for example a paraffin oil. Such liquid organic indicator material particles can be formed of material which is liquid at ordinary ambient temperatures, at room temperature and/or at a freezing temperature, or of a solution of a solid organic material in an organic solvent, for example a paraffin wax dissolved in a paraffin oil, or in another suitable manner.

The organic indicator material can include minor amounts of inorganic material, if desired provided the inorganic material does not interfere with the objectives of the invention, as described herein. Some embodiments of freeze indicator according to the invention employ organic material indicator particles comprising not more than about 10 percent by weight, based upon the weight of the indicator particles, of inorganic material.

The organic indicator material can have any suitable particle size and concentration. For example, the particle size and concentration of the organic indicator material can be selected to help provide a freeze indicator dispersion which is relatively clear before freezing and relatively opaque after freezing, or after freezing and thawing. By employing relatively larger particles in the indicator dispersion, a more opaque post-freezing appearance can be obtained in some embodiments of the invention. Indicator dispersions with unduly large particles may be unstable and prone to settle or coagulate before freezing, or may lack clarity or have undesirable opacity before freezing.

A wide variety of organic indicator material particle sizes can be employed in practicing the present invention. The average particle size of the organic indicator material can be selected according to the desired initial appearance of the indicator dispersion. Thus, an indicator dispersion that is initially transparent and which becomes opaque after being frozen can employ organic indicator particles having an average particle size of less than about 400 nm, desirably less than about 300 nm, for example, an average particle size in the range of from about 10 nm to about 100 nm or of from about 20 nm to about 60 nm.

On the other hand, an indicator dispersion that is initially opaque and exhibits transparency after being frozen can employ organic indicator particles having an average particle size of greater than about 400 nm, for example an average particle size of greater than about 600 nm.

Quantities and Proportions. Useful freeze indicator dispersions according to the invention can employ any suitable proportions of ingredients.

For example, a weight proportion of freeze indicator particles, based upon the weight of freeze indicator dispersion, in a range selected from the group consisting of: from about 1 percent to about 50 percent; from about 5 percent to about 30 percent; and from about 13 percent to about 22 percent, can be utilized.

Also, a weight proportion of aqueous liquid medium, based upon the weight of freeze indicator dispersion, in a range selected from the group consisting of: from about 50 percent to about 99 percent; from about 70 percent to about 95 percent; and from about 77 percent to about 85 percent, can be employed.

Furthermore, any suitable quantity of proteinaceous ice-nucleating agent can be employed in a given volume of freeze indicator dispersion, for example, a weight of from about 1 µg to about 2 mg; or from about 20 µg to about 500 µg; or from about 100 µg to about 250 µg.

In some embodiments of freeze indicator according to the invention, the quantity of proteinaceous ice-nucleating agent employed is independent of the volume of indicator dispersion utilized in the freeze indicator. This is believed to be because, in a volume of supercooled liquid, formation of a single seed crystal anywhere in the volume can cause crystallization to spread rapidly throughout the volume. Accordingly, in such embodiments, the freeze indicator dispersion can comprise a sufficient quantity of ice nucleating agent to provide a reasonable expectation of consistently and reliably generating at least one ice nucleating site in the freeze indicator volume of each of a large number of freeze indicators. For example, a sufficient quantity of ice-nucleating agent can be employed to provide a reasonable expectation of generating a number, such as at least 3, at least 6 or at least 10, ice-nucleating sites in each freeze indicator.

Also employable in a freeze indicator according to the invention, is a proportion by weight, based on the weight of the indicator dispersion, of ice-nucleating agent stabilizer selected from the group consisting of: from about 0.01 percent to about 5 percent; from about 0.05 percent to about 1 percent; and from about 0.1 percent to about 0.5 percent.

Furthermore, if a stabilizer is employed, one of the following stabilizer ratios can be utilized: less than 20; a ratio of 10 or below; a ratio of 4 or below; a ratio of 2 or below; or a ratio of from about 0.2 to about 1.5. The stabilizer ratio, as used here, is the ratio of the weight proportion of ice-nucleating agent stabilizer to the weight proportion of proteinaceous ice-nucleating agent in the indicator dispersion, the weight proportions being based upon the weight of the dispersion.

Other materials that are consistent with the objectives of the invention can also be included in a freeze indicator dispersion employed in a freeze indicator according to the invention, if desired. The invention also includes embodiments of freeze indicator that consist exclusively of, or consist essentially of, the described ingredients.

Freeze Indicator Envelope. Freeze indicators according to the invention can also include an envelope or other containment device to contain and display a suitable volume of freeze indicator dispersion for observation by a human viewer, by an optical device, or by another device. Some suitable envelopes and other containment devices are described in the Taylor et al. patent publications and others will be known or apparent to a person of ordinary skill in the art, in light of this disclosure, or will become known or apparent in the future, as the art develops.

Suitable containment devices for containing and displaying freeze indicator dispersions are referenced herein as "envelopes" and can be understood to comprise one, two, or more, components formed of any suitable material or materials.

For example, a useful freeze indicator envelope can comprise a closed and sealed freeze indicator volume containing the freeze indicator dispersion. The freeze indicator envelope can comprise or be constituted largely or entirely of flexible polymeric film material. The freeze indicator envelope can be formed entirely of a single piece or member of the flexible polymeric film material. Another embodiment of freeze indicator envelope comprises two pieces or members of flexible polymeric film material joined together and sealed. The seal can be effected in any suitable manner for example by employing heat-sealable materials at the facing surfaces in the join. An example of this sealing method, and some other suitable sealing methods, are disclosed in Taylor et al. US 2008/0110391. The polymeric film member or members can be located adjacent to the indicator dispersion and can have an outer surface exposed to the ambient environment of the freeze indicator, if desired.

Usefully, a substantial portion of the inner surface of the freeze indicator envelope, for example a major portion, contacts the freeze indicator dispersion contained in the envelope and a substantial portion of the outer surface of the freeze indicator envelope, for example at least twenty percent of the area of outer envelope surface, is intended to be exposed to ambient conditions in use. For example, the freeze indicator dispersion can fill, or nearly fill the envelope, in the latter case leaving a small gas bubble, optionally of air, in the envelope which can help signal freeze exposure.

To enable an observer to observe, or view, the freeze indicator dispersion and read the indicator signal, the freeze indicator envelope desirably comprises a window having sufficient transparency to enable the indicator signal to be read. If desired, the window can be provided by making the entire freeze indicator envelope transparent. Where the freeze indicator envelope comprises two pieces of flexible polymeric film material sealed together, usefully, at least one of the pieces can be transparent to provide the viewing window.

Figure 2:
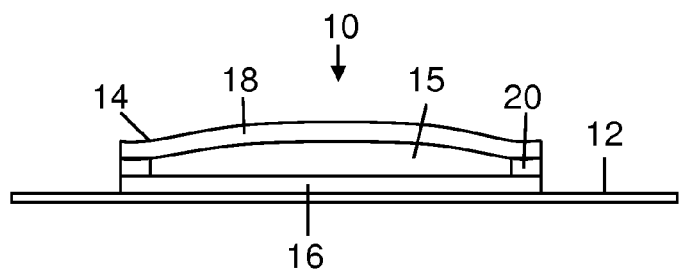
FIG. 2 is a section on the line 2-2 of FIG. 1.

An exemplary embodiment of freeze indicator is shown in FIGS. 1 and 2. Referring to FIGS. 1 and 2, the freeze indicator shown, referenced 10, includes a substrate 12 supporting an envelope 14 which contains a volume of a freeze indicator dispersion 10.

As shown, envelope 14 can be approximately circular. Alternatively, envelope 14 can have any other desired shape, for example, oval, hexagonal, square, rectangular, strip-like or ring-like. Envelope 14, as shown, includes an inner wall 16 and an outer wall 18 joined together by a ring of adhesive 20, or in another suitable manner, for example by fusing. Alternatively, envelope 14 can be a one-piece sealed sac Inner wall 16 of envelope 14 can be adhered to, deposited on, or otherwise attached to substrate 12 so as to attach the envelope to the substrate. Alternatively, substrate 12 can provide inner wall 16 as an integral component of the substrate. For example, inner wall 16 can include a layer, or insert, of aluminum or other material substantially impermeable to water vapor and aqueous liquids, formed integrally with substrate 12.

Outer wall 18 of envelope 14 includes a transparent zone (not referenced) which can occupy approximately the entire footprint of envelope 14 on substrate 12, if desired. Alternatively, the transparent zone of outer wall 18 can occupy a smaller area. The transparent zone enables an optical signal generated by freeze indicator 10, for example, a change in color, to be received externally by a suitable instrument, by a human viewer, or in another suitable manner.

Envelope 14 can be entirely filled with freeze indicator dispersion 15. Alternatively, if desired, an air or gas bubble 22 can be included within the contained volume to provide a visual indication of whether the contained dispersion is in a liquid or a solid state. When the freeze indicator is tilted, or shaken, the gas bubble will not move if the dispersion is frozen.

As shown, freeze indicator 10 is curved about an axis extending horizontally across the plane of the paper and is attached to a convex outer surface of a host product 24, for example by adhesive (not shown). The axis of curvature is beneath the plane of the paper in FIG. 1 and in the plane in FIG. 2. This depiction is merely illustrative, and as noted elsewhere herein various other configurations of freeze indicator 10, shapes of host product 24 and modes of attachment are possible. Such a curved freeze indicator can be rigid or can be flexible and able to adopt a flat configuration.

If an extended shelf life is desirable for the freeze indicator to have, then the freeze indicator envelope can be constructed to limit loss of moisture vapor from the freeze indicator dispersion, for example as is described and claimed in the Taylor et al. patent publications, or in another suitable manner that will be known or apparent to a person of ordinary skill in the art, in light of this disclosure, or will become known or apparent in the future, as the art develops. Undue loss of water vapor from the indicator dispersion during storage can lead to drying out of the indicator, detrimentally affecting the ability of the indicator to signal exposure to a cold temperature.

For example, the freeze indicator envelope can comprise or consist of a layer of a moisture vapor blocking material which extends entirely around the contained volume to control loss of moisture from the freeze indicator dispersion. If desired, the freeze indicator envelope can comprise a multilayer material wherein one or more of the layers is provided by the vapor block material.

A suitable moisture vapor block material, or envelope material embodying a vapor block layer can be a material having a low water vapor transmission rate, for example a water vapor transmission rate of no more than about 1.0 $g/m^2/day$ or a lower rate of 0.50 $g/m^2/day$, if desired. For a longer shelf life, or for other reasons, a water vapor transmission rate of no more than about 0.1 $g/m^2/day$ can be employed. The values for water vapor transmission rate are to be understood to refer to measurements at a temperature of 38° C. (100° F.) and a relative humidity of 90%.

Noting that transparent materials having a relatively low moisture vapor transmission rate may be more expensive, a material having a relatively higher moisture vapor transmission rate can be employed for the freeze indicator when a long shelf life may not be necessary for example for monitoring host products intended for immediate or imminent use.

Suitable vapor block materials include aluminum foil, sheet or coating in an appropriate thickness, for example, a thickness of from about 0.01 mm to about 0.1 mm. Alloys of aluminum, or other metals can be employed and will usually be opaque in useful thicknesses.

Some examples of useful vapor-blocking materials, which can permit viewing of the indicator dispersion when provided in a transparent form, include polychlorotrifluoroethylene, chlorotrifluoroethylene-vinylidene fluoride copolymer, ethylene-chlorotrifluoroethylene copolymer, ethylene-tetrafluoroethylene copolymer, fluorinated ethylene-propylene copolymer, perfluoroalkyl-tetrafluoroethylene copolymer, polytetrafluoroethylene, polyvinylidene fluoride, polyvinyl fluoride, tetrafluoroethylene-hexafluoropropylene copolymers, tetrafluoroethylene-hexafluoropropylene-vinylidene fluoride terpolymers, polychlorotrifluoroethylene, hexafluoropropylene-vinylidene fluoride copolymers, tetrafluoroethylene-propylene copolymers, and tetrafluoroethylene-perfluoromethylether copolymers.

If desired for structural or other purposes, a film or sheet of one or more such vapor blocking materials can be incorporated in a multilayer laminate with one or more other sheet or film materials, for example, polyvinyl chloride, polyethylene, glycolised polyethylene terephthalate, or ethylene-vinyl alcohol copolymer.

Some examples of such multilayer laminate materials include: rigid and flexible blister packaging moisture barrier films; a bilayer laminate of polyyvinyl chloride and polychlorotrifluoroethylene such as that supplied under the trademark ACLAR® 22, by Honeywell International Inc.; a two-layer laminate comprising a 0.2 mm (7.5 mil) layer of polyyvinyl chloride and a 0.015 mm (0.6 mil) layer of PCTFE such as that supplied by Tekni-Plex, Somerville, N.J., under the trademark TEKNIFLEX VA 760, and a three-layer laminate comprising a 0.25 mm (10 mil layer) of polyvinyl chloride, a 0.05 mm (2 mil) layer of polyethylene and a 0.08 mm (3 mil) layer of polychlorotrifluoroethylene, also supplied by Tekni-Plex, under the trademark TEKNIFLEX VPA 10300.

Another suitable multilayer film laminate having useful moisture vapor block properties comprises a printable polyester/polyvinylidene chloride/polyethylene laminate. One example of such a laminate is a product available from the Prairie State Group (Chicago, Ill.) which comprises a relatively thin laminate, for example about 0.012 mm (about 50 gauge), of polyethylene terephthalate provided with a thin coating of polyvinylidene chloride. Desired indicia, if any, can be ink printed on the polyethylene terephthalate surface. Also, a relatively thick layer, for example about 0.062 mm (about 250 gauge) thick, of a linear low-density polyethylene blend can be adhered to the polyvinylidene chloride surface with adhesive, if desired.

The vapor block material employed in the freeze indicator envelope can comprise or consist of any one or more of the foregoing vapor block materials or multilayer laminate materials.

The freeze indicator envelope can have any suitable volume to contain the freeze indicator dispersion. A relatively small volume, such as less than about 2 mL is useful for some purposes and can be employed. Some examples of suitable volumes include a volume in the range of from about 20 µL (microliter) to about 2 mL; a volume in the range of from about 20 µL to about 150 µL; a volume in the range of from about 20 µL to about 80 µL; a volume of up to about 80 µL and a volume of up to about 50 µL.

Substrate. Freeze indicators according to the invention can comprise a substrate supporting the freeze indicator envelope, if desired. The substrate can be, for example, a label or a tag and can furnish a part of, or be comprised by, the freeze indicator envelope.

Such a substrate can be employed to secure the freeze indicator to a host product to be monitored, or to a bulk container or packaging for the host product. The substrate can bear a layer of adhesive, or can have other suitable means to attach the freeze indicator to the host product or to the bulk container or packaging. If desired, the adhesive can be protected with a release liner prior to attachment. Also, the freeze indicator, including the substrate, if present, can be flexible to conform to a curved outer surface of the host product, the bulk container or the packaging, if desired.

Optionally, the substrate can comprise a light-reflecting background to help give the indicator dispersion a desired combination of visual appearances before and after freezing. For example, the freeze indicator dispersion can be transparent before freezing and opaque after having been frozen, or frozen and thawed, and the light-reflecting background can be brightly colored to present a distinct appearance before freezing which is masked after freezing, or freezing and thawing. Thus, the background and the freeze indicator can be initially green, or have another suitable color and can change to white or another distinctly different color or appearance, after freezing, when the background is masked by the coagulated dispersion.

If desired, the freeze indicator can comprise a reference area proximate to the freeze indicator envelope which has an appearance similar to an end point of the freeze indicator or has another appropriate graphic character which can facilitate reading the freeze indicator signal. Optionally, such a reference area can be printed on the freeze indicator substrate, if employed.

A multiplicity of freeze indicators, including substrates if employed, can be arrayed on sheet stock or a continuous web, if desired.

Fabrication of Freeze Indicators. Aliquots of freeze indicator dispersions according to the invention can be fabricated into individual freeze indicators by any suitable method. Suitable methods include charging aliquots of freeze indicator dispersion into mass-producible packages, for example, an array of dimple-like blisters preformed in sheets or in one or more continuous films of a suitable packaging material, closing the blisters and cutting or otherwise separating the array into individual freeze indicators. Some suitable methods are described in the Taylor et al. patent publications and others will be known or apparent to a person of ordinary skill in the art, in light of this disclosure, or will become known or apparent in the future, as the art develops.

examples are formulated at ambient room temperature, approximately 20° C. to 25° C. The pH value of each formulation is determined experimentally with reference to the liquid medium in the formulation, and is usually somewhat less than that of the wax dispersion received from the supplier, as shown under the heading "Formulation pH" in Table 1B.

TABLE 1B

Effect of Wax Dispersion pH on Freeze-Onset Temperature

| | | Concentration (weight %) | | | | | Freeze Onset Temperature | |
|---|---|---|---|---|---|---|---|---|
| | Wax | | | Stabilizer | | Stabilizer | Formulation | |
| Ex. | pH | Wax | Protein | (50%) | $D_2O$ | Ratio | pH | Initial | Aged |
| 1(C) | 11 | 49.48 | 0.05 | 0.99 | 49.48 | 20 | 10.7 | −1.5° C. | −1.5° C. |
| 2 | 9.5 | 49.48 | 0.05 | 0.99 | 49.48 | 20 | 9.3 | −1.0° C. | −1.0° C. |
| 3 | 9.0 | 49.48 | 0.05 | 0.99 | 49.48 | 20 | 9.0 | −1.0° C. | −1.0° C. |
| 4 | 8.5 | 49.48 | 0.05 | 0.99 | 49.48 | 20 | 7.7 | 0.0° C. | −0.5° C. |
| 5 | 7.2 | 49.48 | 0.05 | 0.99 | 49.48 | 20 | 6.9 | −0.5° C. | −1.0° C. |
| 6 | 4.7 | 49.48 | 0.05 | 0.99 | 49.48 | 20 | 4.0 | −0.5° C. | −1.0° C. |
| 7 | 4.0 | 49.48 | 0.05 | 0.99 | 49.48 | 20 | 3.9 | −1.0° C. | −1.5° C. |

Some illustrative and nonlimiting examples of the practice of some aspects of the invention, and one or more comparative examples, will now be described.

EXAMPLES 1-7

Effect of pH on Freeze Indicator Dispersions

Seven wax dispersions, having different pH values, ranging from an acidic pH of 4.0 to an alkaline pH of 11.0, and other characteristics, as shown in Table 1A, are obtained from supplier Michelman Inc., Cincinnati, Ohio, and formulated into Examples 1-7, as is described below. In Table 1A, the "Wax pH" refers to the pH of the wax dispersion, the wax utilized in the wax dispersion is a paraffin/synthetic wax blend and the supplier's product code for the wax dispersion is as stated in the table.

TABLE 1A

Composition of Wax Dispersions

| Ex. | Wax pH | Dispersion Medium | Product Code | Solids Content (wt %) |
|---|---|---|---|---|
| 1 | 11 | deuterium oxide | DTOX1 | 30 |
| 2 | 9.5 | deuterium oxide | TTX9.5D | 32 |
| 3 | 9.0 | deuterium oxide | TTX9.0D | 33 |
| 4 | 8.5 | deuterium oxide | TTX1D | 35 |
| 5 | 7.2 | deuterium oxide | TTX3D | 30 |
| 6 | 4.7 | deuterium oxide | TTX2D | 30 |
| 7 | 4.0 | deuterium oxide | TTX14D | 30 |

The wax dispersions employed all have a viscosity of less than 100 cps. These seven wax dispersions are formulated into freeze indicator dispersions for Examples 1-7, using the ingredients and proportions shown in Table 1B. The proportions are by weight, based on the weight of the freeze indicator dispersion and the ingredient total for each example is 100, so that the proportions are also percentages. The Deuterium oxide, in the respective weight proportion shown in Table 1B, under the heading "$D_2O$", is added to the appropriate wax dispersion for each of Examples 1-7 to provide a liquid dispersion medium. The resultant formulations are stirred for one hour. An ice-nucleating agent, SNOMAX (trademark) snow inducer, containing on average about 54 percent by weight protein sourced from the bacterium P. syringae and including ice-nucleating protein (labeled "protein" in Table 1B), is ground to a fine powder and added to the appropriate diluted wax dispersion for each of Examples 1-7, in a proportion of 0.05 percent by weight, as indicated in Table 1B.

The actual weight of ice-nucleating agent in each sample can be calculated from the proportional value and the volume of the indicator assuming that the density of the indicator liquid is 1.0. Thus, employing an 80 μL aliquot of freeze indicator dispersion in each blister provides a quantity of ice nucleating agent of 40 μg per blister.

A 50 percent weight-for-weight aqueous solution of glutaraldehyde stabilizer (Sigma-Aldrich) in "light" water, as opposed to deuterium oxide, is added to each of the ice-nucleating-agent-containing diluted wax dispersions, in the weight proportion indicated in Table 1B, and each dispersion is stirred for two hours to provide the freeze indicator dispersions of Examples 1-7. The relative proportions of protein and stabilizer provide a stabilizer ratio of 20 as shown in Table 1B.

Example 1, labeled (C) in Table 1B is a comparative example.

Test Procedure. Each of the freeze indicator dispersions of Examples 1-7 is subjected to a simple test to determine the freeze onset temperature exhibited by the formulation. For this purpose, within no more than two days of the formulation of the dispersion, 20 samples of each dispersion are prepared by pipetting an 80 μL aliquot of the dispersion into a clear polypropylene vial. The vials are capped and immersed into a water bath and maintained at a temperature of +2° C. for one hour. After one hour, the temperature is reduced in 0.5° C. increments every 15 minutes.

The samples are carefully observed to determine the temperature at which the onset of a freeze response, when an unambiguous appearance change occurs from an initial clear or slightly turbid appearance before freezing to an opaque white or an opaque whitish appearance with slight coloration, after freezing. Some freeze onset temperatures obtainable for Examples 1-7 by this procedure are described in Table 1B under the heading of "Initial" freeze onset temperature. In each case, the freeze onset temperature is the temperature at which all 20 samples exhibit a distinct appearance change indicative of freezing of the liquid medium employed. For example, if twelve samples responded at −1.0° C. and the remaining eight responded at −1.5° C., the freeze onset temperature is recorded as −1.5° C.

Each of Examples 1-7 retains an opaque appearance after thawing and the appearance change, from clear or slightly turbid to an at least somewhat opaque appearance, is irreversible.

Twenty more samples of each dispersion are stored for at least four weeks at a room temperature of about 20° C. to about 25° C., and the freeze onset temperature is again determined using the procedure described above, to provide aged freeze onset temperatures as are described under the heading "Aged" in Table 1B. Similar headings have similar meanings throughout the data tables that appear herein.

The results shown in Table 1B for Examples 1-7 illustrate how adjustment of the pH of the described indicator dispersion can be used to control the freeze onset temperature and provide a relatively high freeze onset temperature. With an appropriate pH level, improved initial and aged freeze onset temperatures are obtainable notwithstanding that the stabilizer ratio, at 20, may not be optimal in some cases, as the data in Table 2 (to be described) shows.

The high freeze onset temperature among the test samples is exhibited by the indicator dispersion of Example 4 which employ a wax dispersion having a pH of 8.5 and a formulation pH of 8.0. Example 4 shows an initial freeze onset temperature of 0.0° C.

Relatively low freeze onset temperatures are generally exhibited by test samples having pH values that are high or low. More desirably, the pH can have an intermediate value, for example, in the range of from about 4 to about 11.

After aging for at least 4 weeks at room temperature, all examples tested exhibit freeze onset temperatures within about 0.5° C. of the initial freeze onset temperature for the example. Examples 2-6, with pH values in the range of about 4 to about 9.5 all exhibit a useful aged freeze onset temperature of −1.0° C. or higher.

EXAMPLES 8-27

Effects of Ice Nucleating Agent and Stabilizer Concentrations on Freeze Indicator Dispersions The procedure employed in Examples 1-7 is repeated to provide the freeze indicator dispersions of Examples 8-27, using the proportions of ingredients shown in Table 2. As was the case in Table 1B, in Table 2, the proportions given are by weight and the ingredient total for each example is 100 so that the proportions are also percentages.

As with Examples 1-7, the actual weight of ice nucleating agent in each sample can be calculated, from the proportional value and the volume of the indicator assuming that the density of the indicator liquid is 1.0. Thus, employing an 80 µL aliquot of freeze indicator dispersion in each blister provides respective quantities of ice nucleating agent of 40 µg (Examples 8-10 and 17-19), 120 µg (Examples 11-13 and 20-23) and 200 µg (Examples 14-16 and 24-27.)

Examples 8-27 are arranged in two groups according to the pH of the wax dispersion employed. One group, Examples 8-16 employs the wax dispersion used in Example 1 which has a pH of 11. A wax dispersion pH of 11, pH 10.7 in the formulation in Example 1, is associated with a less desirable freeze onset temperature as shown by test results for Example 1. The other group, Examples 17-27 employs the wax dispersion used in Example 4 which has a pH of 8.5. A wax dispersion pH of 8.5, pH 7.7 in the formulation in Example 4, is associated with the best freeze onset temperature described in Table 1B, as shown by test results for Example 4. Each group of examples includes a control example, respectively, Example 8 or Example 17.

Each of the freeze indicator dispersions of Examples 8-27 is tested to determine a freeze onset temperature using the test procedure described for Examples 1-7. Some freeze onset temperatures obtainable for Examples 8-27 are described in Table 2.

TABLE 2

Effect of Concentrations of Ice Nucleating Agent and Stabilizer on Freeze Onset Temperature

| | | Concentration (%) | | | | | Freeze Onset Temperature | |
| --- | --- | --- | --- | --- | --- | --- | --- | --- |
| Ex. | Wax pH | Wax | Protein (54%) | Stabilizer (50%) | $D_2O$ | Stabilizer Ratio | Formulation pH | Initial | Aged |
| 8(C) | 11 | 49.98 | 0.05 | 0.0 | 49.98 | N/A | 10.7 | −1.0° C. | −1.5° C. |
| 9 | 11 | 49.94 | 0.05 | 0.075 | 49.94 | 1.5 | 10.6 | −0.5° C. | −1.5° C. |
| 10 | 11 | 48.48 | 0.05 | 3.0 | 48.48 | 60 | 10.1 | −1.5° C. | −1.5° C. |
| 11 | 11 | 49.89 | 0.15 | 0.075 | 49.89 | 0.5 | 10.7 | −0.5° C. | −1.0° C. |
| 12 | 11 | 49.88 | 0.15 | 0.1 | 49.88 | 0.7 | 10.1 | −0.5° C. | −1.0° C. |
| 13 | 11 | 49.85 | 0.15 | 0.15 | 49.85 | 1 | 10.3 | −0.5° C. | −1.0° C. |
| 14 | 11 | 49.78 | 0.25 | 0.2 | 49.78 | 0.8 | 10.2 | −0.5° C. | −0.5° C. |
| 15 | 11 | 49.63 | 0.25 | 0.5 | 49.63 | 2 | 10.4 | −0.5° C. | −2.5° C. |
| 16 | 11 | 49.38 | 0.25 | 0.99 | 49.38 | 4 | 10.4 | −0.5° C. | −1.5° C. |
| 17(C) | 8.5 | 49.98 | 0.05 | 0.0 | 49.98 | N/A | 7.9 | 0.0° C. | 0.0° C. |
| 18 | 8.5 | 49.94 | 0.05 | 0.075 | 49.94 | 1.5 | 8.0 | −0.5° C. | −0.5° C. |
| 19 | 8.5 | 49.73 | 0.05 | 0.5 | 49.73 | 10 | 8.1 | −0.5° C. | −1.0° C. |
| 20 | 8.5 | 49.89 | 0.15 | 0.075 | 49.89 | 0.5 | 7.9 | 0.0° C. | −0.5° C. |
| 21 | 8.5 | 49.68 | 0.15 | 0.5 | 49.68 | 3.3 | 7.9 | 0.0° C. | −0.5° C. |
| 22 | 8.5 | 49.43 | 0.15 | 0.99 | 49.43 | 6.6 | 7.9 | −0.5° C. | −1.0° C. |
| 23 | 8.5 | 48.44 | 0.15 | 2.97 | 48.44 | 20 | 8.0 | −1.0° C. | −1.5° C. |
| 24 | 8.5 | 49.75 | 0.25 | 0.25 | 49.75 | 1 | 8.0 | 0.0° C. | −0.5° C. |
| 25 | 8.5 | 49.63 | 0.25 | 0.5 | 49.63 | 2 | 7.9 | 0.0° C. | −0.5° C. |
| 26 | 8.5 | 49.38 | 0.25 | 0.99 | 49.38 | 4 | 8.0 | −0.5° C. | −0.5° C. |
| 27 | 8.5 | 47.40 | 0.25 | 4.95 | 47.40 | 20 | 8.0 | −1.5° C. | −1.5° C. |

Examples 8 and 17, marked "(C)" are controls employing no stabilizer in the formulation.

The weight proportion of wax indicator solids, based upon the weight of freeze indicator dispersion, that is employed in each of Examples 1-27 can be calculated from the data in Tables 1A, 1B and 2 to lie within a range of from about 14.5 to about 17.5 percent. Similarly, the weight proportion of liquid medium, based upon the weight of freeze indicator dispersion, that is employed in each of Examples 1-27 can be calculated from the data in Tables 1A, 1B and 2 to lie within a range of from about 82.5 to about 85 percent.

Examples 9 through 16, employing a wax dispersion having a pH of about 11, and Examples 18 through 27, employing a wax dispersion having a pH of about 8.5, illustrate the effects of the proportion of ice nucleating agent, the proportion of stabilizer solution, and the stabilizer ratio, on the freeze onset temperature.

The stabilizer ratio is the weight ratio of stabilizer solution to ice nucleating agent. Noting that the stabilizer solution employed contains 50 percent by weight stabilizer, and the ice-nucleating agent contains an average of about 54 percent protein by weight, the ratio of stabilizer compound to protein compound will be slightly lower than the figures given in the Tables. This is because the stabilizer ratios in the Tables relate to the weight ratio of stabilizer solution (rather than stabilizer) to the ice nucleating agent (rather than protein).

Quantity of Ice-Nucleating Agent. Given that the samples have similar volumes (80 µL), the quantity of ice nucleating agent in each sample is directly related to the concentration, as shown in Table 2. Referring to Table 2, Examples 9 and 11-16 all show a relatively high initial freeze onset temperature of −0.5° C., while employing various amounts of ice-nucleating agent, notably 0.05, 0.15 or 0.25 by weight, as shown in the table.

Employing a wax dispersion with a more favorable pH of 8.5, the high examples, Examples 17 (control), 20, 21, 24 and 25 show a good initial freeze onset temperature of 0.0° C., which is higher than that of any of Examples 8-16 which use the pH 11 wax dispersion. Once again, various amounts of ice-nucleating agent are employed. These results are consistent with the hypothesis that the ice-nucleating phenomenon is not solely dependent on the concentration of the ice-nucleating agent.

Bulk formulations of indicator dispersion containing higher concentrations of ice-nucleating agent solutions or dispersions can exhibit significant turbidity and may have a slight peach or other coloration. In some cases, visible turbidity may be undesirable in an end product freeze indicator and may confuse the visible signal the indicator sends to an observer.

Surprisingly however, in formulations where concentration of the ice-nucleating agent is increased by a factor of about 3 to 5, for example to a level above a concentration of 0.05 or 0.15 percent, or above 0.25 percent, when the formulation is measured out into individual 80 µL samples for testing, as described herein, the clarity of the samples does not appear to be adversely affected. Upon testing each of Examples 1-7 exhibits an unambiguous change from slightly turbid to opaque white. The slight turbidity observable appears to be inadequate to confuse the indicator signal.

Concentration of Stabilizer Referring again to Table 2, Examples 10, 23 and 27 suggest that higher proportions of stabilizer (glutaraldehyde in the examples) can adversely impact the freeze response temperature of freshly made formulations. Thus, both Example 10, which employs a proportion of stabilizer solution of about 3 percent by weight, and Example 27, which employs a proportion of stabilizer solution of about 5 percent by weight, exhibit relatively low freeze onset temperatures of about −1.5° C.

In contrast to Example 10, Example 9 which employs the same amount of ice-nucleating agent (0.05 percent by weight), but less glutaraldehyde stabilizer solution (0.075 percent by weight) exhibits a relatively high freeze onset temperature of about −0.5° C. Example 26 which employs the same amount of ice-nucleating agent (0.25 percent by weight), and less glutaraldehyde stabilizer solution (0.99 percent by weight) than Example 27, also exhibits a relatively high freeze onset temperature of about −0.5° C.

Stabilizer Ratio. Some of the results described in Table 2 support the hypothesis that a relatively low stabilizer ratio can be helpful in providing a relatively high freeze onset temperature. Thus, Examples 9, 10-16, 18-22 and 24-26 have a relatively low stabilizer ratio, well below 20, and exhibit a freeze-onset temperature of −0.5° C. or 0.0° C. In contrast, Examples 10, 23 and 27 employ a stabilizer ratio of 20 or higher and show a relatively low initial freeze-onset temperature of about −1.5° C. (Examples 10 and 27) or about −1.0° C. (Example 23). It appears from these data that a stabilizer ratio below 20 can be helpful in providing a freeze onset temperature above −1.0° C., for example −0.9° C. or higher.

Furthermore, Example 15, employing a stabilizer concentration of about 0.5 percent, can be seen to exhibit an adverse impact on the freeze onset temperature observable after aging. As shown in Table 2, the freeze onset temperature for Example 15 declines from an initial value of −0.5° C. to −2.5° C. after aging for four weeks at room temperature.

Comparing Example 15 with Example 14, shows that a counter-intuitive reduction in the stabilizer ratio, in this case from 2 to 0.8, obtained by reducing the proportion of stabilizer from 0.5 to 0.2 (rather than increasing the proportion of stabilizer supposedly to increase the stability), elevates the freeze onset temperature after aging, from −2.5° C. to −0.5° C. This freeze onset temperature elevation is a significant difference.

In contrast, comparing Example 16 with Example 15 shows that increasing the proportion of stabilizer from 0.5 to about 1, while increasing the stabilizer ratio from 2 to 4, yields an aged freeze onset temperature which is somewhat improved, at −1.5° C., but is not as high as is obtained in Example 14 by reducing the stabilizer ratio and the amount of stabilizer.

Examples employing a stabilizer ratio of about 4 or below generally show good results and are useful in the practice of one or more aspects of the invention.

Furthermore, the examples employing a stabilizer ratio of about 2 or below, namely Examples 9, 13, 15, 18, 20, 24 and 25, each exhibit a high freeze-onset temperature of −0.5° C. or 0.0° C. Such examples can have additional uses, for example in applications where a freeze-onset temperature of −0.9° C. or higher is desired.

This second group of examples which employ a formulation pH within the range of from 7.9 to 8.1 all show aged freeze onset temperatures that are within 0.5° C. of their initial freeze onset temperatures. Control example 17(C) shows no decline in the aged freeze onset temperature. Possible explanations include that the presence of minor amounts of biocide in the starting ingredients may prevent microbial degradation of the proteinaceous ice-nucleating agent and that the stabilizer, which is employed in other examples, and is useful for thermal stability, can sometimes reduce the efficiency of the ice nucleating agent. Use of a stabilizer, to protect the proteinaceous ice-nucleating agent against possible thermal degradation occasioned by elevated ambient temperatures, is desirable in some freeze indicator embodiments of the invention.

EXAMPLES 28-32

Machine Prototypes

The procedure employed in Examples 1-7 is repeated to provide the freeze indicator dispersions of Examples 28-32, using the proportions of ingredients shown in Table 3. As was the case in Table 1, in Table 3, the proportions given are by weight and the ingredient total for each example is 100 so that the proportions are also percentages.

The weight proportion of wax indicator solids, based upon the weight of freeze indicator dispersion that is employed in each of Examples 28-32, can be calculated from the data in Tables 1A and 3 to lie within a range of from about 14.85 percent to about 20.95 percent. Similarly, the weight proportion of liquid medium, based upon the weight of freeze indicator dispersion, that is employed in each of Examples 28-32 can be calculated from the data in Tables 1A and 3 to lie within a range of from about 78.8 to about 84.1 percent.

In Examples 28-32, rather than using polypropylene vials, as is described in Examples 1-7, aliquots of about 80 μL of each well mixed example are delivered into pre-formed blister pack dimples, which serve as laboratory prototypes for machine-based mass production, using a liquid pumping system. The blister pack dimples are preformed in a polyethylene/polyester laminate film and have a heat-sealing adhesive coating. After charging with aliquots of freeze indicator dispersion, the blister pack dimples are then heat-sealed and die cut into individual blisters using a blister heat-sealing machine.

TABLE 3

Composition of Examples 28-32

| | | Concentration (%) | | | | | |
|---|---|---|---|---|---|---|---|
| Ex. | Wax pH | Wax Dispersion | INA | Stabilizer (50%) | $D_2O$ | Stabilizer Ratio | Formulation pH |
| 28 | 11 | 49.48 | 0.05 | 0.99 | 49.48 | 20 | 10.4 |
| 29 | 11 | 49.48 | 0.54 | 0.50 | 49.48 | 1 | 10.5 |
| 30 | 8.5 | 59.87 | 0.15 | 0.075 | 39.91 | 1.5 | 8.0 |
| 31 | 8.5 | 59.55 | 0.25 | 0.50 | 39.70 | 2 | 8.0 |
| 32 | 8.5 | 59.70 | 0.25 | 0.25 | 39.80 | 1 | 8.0 |

Referring to Table 3, Example 28 has the same composition as Example 1 and in a bulk formulation appears as a slightly turbid dispersion. A bulk formulation of Example 29 is more turbid than that of Example 28 and pinkish in color. Bulk formulations of Examples 30, 31 and 32 are slightly more turbid than the bulk formulation of Example 28, and are somewhat peach-colored. However, in the blister pack dimples, each formulation is clear or only slightly turbid.

Each of the freeze indicator dispersions of Examples 28-32 is tested to determine a freeze onset temperature using the test procedure described for Examples 1-7. 100 machine prototype samples are tested for each example.

If necessary, for example, because settling of the ice-nucleating agent may have occurred, the dispersions can be thoroughly mixed before dispensing into the blisters. In general, some settling of the ice-nucleating agent in the blisters is acceptable and is unlikely to adversely affect either the appearance or the performance of the freeze indicator. If settling of the ice-nucleating agent occurs in the bulk formulation of the freeze indicator dispersion, thorough mixing can assure that an appropriate aliquot of ice-nucleating agent is delivered to each blister. Usually, it is desirable that the dispersed wax particles do not settle appreciably during the life of the freeze indicator.

Some initial freeze onset temperatures obtainable for Examples 28-32 within a few days of manufacture by means of the test described herein are shown in Table 4.

TABLE 4

Initial Freeze Onset Temperatures for Examples 28-32

| | | Number of Prototypes Changing at Each Temperature | | | | | |
|---|---|---|---|---|---|---|---|
| Ex. | Number of Samples | 0.5° C. | 0.0° C. | −0.5° C. | −1.0° C. | −1.5° C. | −2.0° C. |
| 28 | 100 | 0 | 0 | 5 | 79 | 16 | — |
| 29 | 100 | 0 | 30 | 70 | — | — | — |
| 30 | 100 | 19 | 81 | — | — | — | — |
| 31 | 100 | 0 | 2 | 98 | — | — | — |
| 32 | 100 | 0 | 12 | 88 | — | — | — |

The experimental data in Table 4 for the machine prototype tests on the formulations of Examples 28-32 demonstrate that adjusting the amount of ice nucleating agent, of stabilizer solution and of the ratio of stabilizer to ice nucleating agent, can affect the freeze-onset temperature. Thus, Examples 29 through 32 each employ between 3 and 11 times more ice nucleating protein than comparative formulation 28, and a stabilizer ratio 10 to 20 times lower than that of Example 28. Furthermore, each of the 100 test samples for each of Examples 29 through 32 exhibits a freeze onset temperature which is higher than the freeze onset temperature exhibited by 95 percent of the Example 28 samples.

Surprisingly, increasing the amount of ice nucleating agent, by as much as a factor of almost 11 in the case of Example 29 as compared with Example 28, does not appear to have a detrimental impact on the manufacture of the machine prototype blisters or on the appearance of the blisters. In spite of the viscosity increases attributable to the gelling effects of the proteinaceous ice nucleating agent, and the stabilizer, the new formulations usually can be adequately accommodated by the liquid pumping system employed in the production equipment, by making minor adjustments to the system.

In the case of Example 29, settling produces a pink-colored sediment. In the tests, all the sample blisters give a freeze onset response that is an unambiguous change from slightly turbid to opaque white. The relatively high proportion of wax indicator particles in the dispersions contributes helpfully to the opacity of the frozen indicator material.

Despite the increased turbidity and pinkish hue of the formulation of Example 29 compared to that of Example 28 when formulated in bulk, the difference between the small volume machine prototype samples of Examples 28 and 29, when frozen, is negligible. In the unfrozen state, a small difference between the machine prototypes of Examples 28 and 29 is apparent, upon close examination, as the presence of a faint pinkish gel inside the blisters of the Example 29 samples. Such a minor coloration does not detract significantly from the appearance of the freeze indicators and does not interfere with the ability of the indicators to signal a freeze event with a strong, unambiguous visual change from clear to opaque.

After thawing, all samples exhibit an opaque appearance, almost the same as when frozen. Thawed, indicator samples may appear to be a little whiter than frozen ones.

Machine prototype samples of Examples 30, 31, and 32 are re-tested after storage for at least 4 weeks at room temperature and some freeze onset temperatures obtainable are described in Table 5.

TABLE 5

4-Week Freeze Onset Temperatures for Examples 28-32

| Ex. | Number of Samples | Number of Prototypes Changing at Each Temperature | | | | | |
|---|---|---|---|---|---|---|---|
| | | 0.5° C. | 0.0° C. | −0.5° C. | −1.0° C. | −1.5° C. | −2.0° C. |
| 30 | 100 | 0 | 38 | 62 | — | — | — |
| 31 | 100 | 0 | 1 | 99 | — | — | — |
| 32 | 100 | 0 | 30 | 70 | — | — | — |

Referring to Table 5, it can be seen that in each case, the initial freeze response temperature is quite closely maintained, within about 0.5° C.

From the data in Tables 4 and 5, Examples 30 and 32 can be seen to yield a relatively high freeze onset temperature of at least about −0.5° C. and to perform consistently over time. Notably, no significant decrease in the freeze onset temperature after 4 weeks of storage is apparent. Also, with each of Examples 29-32, 100 out of 100 samples yield a clear freeze signal at a temperature no lower than about −0.5° C. demonstrating a commercially useful consistency and reliability of the formulations.

The invention includes a freeze-sensitive host product, for example a vaccine, a medication or a foodstuff, having a freeze indicator embodiment of the invention associated with the host product to indicate possible exposure of the host product to a temperature at or near the liquid medium frozen state melting point. The host product can be any freeze-sensitive product including the freeze-sensitive products described herein, other freeze-sensitive products described in the Taylor et al. patent publications or any other freeze-sensitive products that will be known or apparent to a person of ordinary skill in the art, in light of this disclosure, or will become known or apparent in the future.

Some examples of suitable host products include: freeze-perishable health care products, for example vaccines, drugs, medicaments, pharmaceuticals, medical devices, prophylactics, vaccine vials, syringes containing perishable biologicals, or other freeze-sensitive health care products, biological materials having therapeutic uses, cultures, organs and other human or animal body parts, blood and perishable blood products; diagnostic devices, kits and ingredients containing freeze-perishables; freeze-sensitive biological materials for industrial uses; freeze-sensitive industrial products including latex paints and the like; and freeze-sensitive food products, fruits, truffles, gourmet meats, fish and other food products whose organoleptic qualities may be impaired by freezing.

Other examples of suitable host products will be known or apparent to a person of ordinary skill in the art, in light of this disclosure, or will become known or apparent in the future.

By way of example, the freeze indicator can be attached to the host product by an adhesive-coated substrate which supports the freeze indicator. Such a construction and other constructions of freeze indicator, including flexible freeze indicators, and means for association with, or attachment of freeze indicators to host products, as well as a variety of host products, are all described in the Taylor et al. patent publications. Such constructions, arrangements and methods can be employed in practicing the present invention, if desired.

Benefits Obtainable. Various useful freeze indicator embodiments of the invention can provide various benefits, for example: a relatively high initial freeze onset temperature; an initial freeze onset temperature of about −1° C.; an initial freeze onset temperature near or at 0° C., or between −1° C. and 0° C.; an initial freeze onset temperature of about 0.5° C.; a relatively high freeze onset temperature after storage, for example for four weeks or more; and a reliable and consistent indicator response.

Additional benefits that can be obtained with embodiments of freeze indicator according to the invention include: an irreversible appearance change in response to freezing; suitability for mass production at a low cost; a clear, easily read signal, or indication, of past exposure to freezing conditions; and an indicator dispersion having a light-transmissive appearance before freezing which permits an optional reflective background behind the indicator dispersion to be perceived by a viewer, and which becomes obscured after freezing by the coagulated indicator dispersion.

In summary, the invention provides, inter alia, freeze indicator embodiments which can respond at relatively high temperatures to provide a reliable and reproducible signal of freeze exposure, can provide a visual signal of past freeze exposure with good visual intensity, and can provide low rates of false positives and/or of false negatives.

Disclosures Incorporated. The entire disclosure of each and every United States patent and patent application, each foreign and international patent publication, of each other publication and of each unpublished patent application that is specifically referenced in this specification is hereby incorporated by reference herein, in its entirety. Should there appear to be conflict between the meaning of a term employed in the description of the invention in this specification and with the usage in material incorporated by reference from another document, the meaning as used herein is intended to prevail.

About the Description. The foregoing detailed description is to be read in light of and in combination with the preceding background and invention summary descriptions wherein partial or complete information regarding the best mode of practicing the invention, or regarding modifications, alternatives or useful embodiments of the invention may also be set forth or suggested, as will be apparent to one skilled in the art.

The terms "include," "have," "has," and "contain," and their various grammatical forms, are to be understood as being open-ended and not to exclude additional, unrecited elements or method steps.

The use of the singular herein is intended to include the plural (and vice versa) unless the context indicates otherwise. In addition, where the term "about" is used before a quantitative value, the specific quantitative value itself is intended to be included, unless specifically stated otherwise.

Throughout the description, where compositions instruments, devices apparatus, systems, or processes are described as having, including, or comprising specific components or elements, or in the case of processes, specific steps, it is contemplated that compositions instruments, devices apparatus, systems, or processes according to the present invention can also consist essentially of, or consist only of, the recited components, elements or steps.

In this specification, where an element or component is said to be included in and/or selected from a list or group of recited elements or components, the element or component can be any one of the recited elements or components or can be selected from a group consisting of two or more of the recited elements or components.

With regard to processes, it is to be understood that the order of steps or order for performing certain actions is immaterial so long as the described process remains operable. Moreover, two or more steps or actions may be conducted simultaneously, unless the context indicates otherwise. In addition, any proportions recited herein are to be understood to be proportions by weight, based upon the weight of the relevant composition, unless the context indicates otherwise.

The description of the invention is to be understood as including combinations of the various elements of the invention, and of their disclosed or suggested alternatives, including alternatives disclosed, implied or suggested in any one or more of the various methods, products, compositions, systems, apparatus, instruments, aspects, embodiments, examples described in the specification or drawings, if any, and to include any other written or illustrated combination or grouping of elements of the invention or of the possible practice of the invention, except for groups or combinations of elements that are incompatible with, or contrary to the purposes of the invention, as will be or become apparent to a person of ordinary skill.

The description of background art herein may include insights, discoveries, understandings or disclosures, or associations together of disclosures, that are not known to the relevant art prior to the present invention but which are provided by the invention. Some such contributions of the invention may have been specifically pointed out herein, whereas other such contributions of the invention will be apparent from their context. Merely because a document may have been cited here, no admission is made that the field of the document, which may be quite different from that of the invention, is analogous to the field or fields of the present invention.

Scope of the Invention. The present invention includes the examples and embodiments described herein and other specific forms of the invention that embody the spirit or essential characteristics of the invention or of the respective described example or embodiment. The foregoing examples and embodiments are in all respects intended to be illustrative of the invention described herein. It is to be understood that many and various modifications of the invention, or of an example or embodiment of the invention described herein will be apparent to those of ordinary skill in the relevant art, or may become apparent as the art develops, in the light of the foregoing description. Such modifications are contemplated as being within the spirit and scope of the invention or inventions disclosed herein.

The invention claimed is:

1. A freeze indicator including an indicator dispersion, the indicator dispersion comprising:
    an aqueous liquid medium having a melting temperature and a freezing temperature, the freezing temperature being below the melting temperature; and
    organic material indicator particles dispersed in the aqueous liquid medium; and
    a proteinaceous ice-nucleating agent;
    wherein the indicator dispersion has an initial appearance before freezing and an irreversibly different appearance after freezing;
    wherein the aqueous liquid medium has a pH in the range of from about 4 to about 9.5; and
    wherein the freeze indicator can exhibit a freeze-onset temperature of about −1° C. within one hour of exposure to the freeze-onset temperature.

2. A freeze indicator according to claim 1 wherein the proteinaceous ice-nucleating agent is obtained from a microorganism selected from the group consisting of *Pseudomonas species, Pseudomonas syringae*, strains of *Pseudomonas syringae, Pseudomonas fluorescens, Pseudomonas coronafaciens, Pseudomonas pisi, Erwinia* species, *Erwinia ananas, Erwinia herbicola, Escherichia coli*, Xanthomonas, ice-nucleating fungi, and ice-nucleating protozoa.

3. A freeze indicator according to claim 1 wherein the aqueous liquid medium comprises at least about 90 percent by weight, based on the weight of the liquid medium, of deuterium oxide.

4. A freeze indicator according to claim 3 wherein the freeze indicator can exhibit freeze- onset at a temperature in a range of from at least −0.9° C. to about 0° C. within 15 minutes of exposure to the freeze-onset temperature.

5. A freeze indicator according to claim 3 wherein the freeze indicator can exhibit freeze- onset at a temperature of about 0° C.

6. A freeze indicator according to claim 1 wherein the freeze indicator can exhibit freeze- onset at a temperature of at least −0.5° C.

7. A freeze indicator according to claim 1 wherein the freeze indicator can exhibit freeze- onset at a temperature of at least about 1° C. after at least four weeks of storage at a room temperature of about 20° C. to about 25° C.

8. A freeze indicator according to claim 1 wherein after at least four weeks of storage at a room temperature of about 20° C. to about 25° C. the freeze indicator can exhibit a freeze-onset at a temperature of not more than 0.5° C. lower than the freeze-onset temperature when fresh.

9. A freeze indicator according to claim 1 wherein the aqueous liquid medium has a pH in the range of from about 7.8 to about 8.2.

10. A freeze indicator according to claim 1 wherein the organic material indicator particles comprise solid particles of a hydrophobic organic material in a proportion of from about 5 percent to about 30 percent by weight, based upon the weight of indicator dispersion, and the freeze indicator can exhibit freeze onset within 15 minutes of exposure to the freeze-onset temperature.

11. A freeze indicator according to claim 10 wherein the hydrophobic organic material comprises one or more waxy materials or one or more waxy materials blended with a wax softener.

12. A freeze indicator according to claim 1 comprising a quantity of the proteinaceous ice-nucleating agent selected from the group consisting of: from about 1 µg to about 2 mg; from about 20 µg to about 500 µg; and from about 100 µg to about 250 µg.

13. A freeze indicator according to claim 1 comprising a stabilizer to stabilize the proteinaceous ice-nucleating agent.

14. A freeze indicator according to claim 13 comprising a proportion by weight, based on the weight of the indicator dispersion, of ice-nucleating agent stabilizer selected from the group consisting of: from about 0.01 percent to about 5 percent; from about 0.05 percent to about 1 percent; and from about 0.1 percent to about 0.5 percent.

15. A freeze indicator according to claim 13 comprising a stabilizer ratio selected from the group of ratios consisting of: less than 20; 10 or below; 4 or below; 2 or below; and from about 0.2 to about 1.5; the stabilizer ratio being the ratio of the weight proportion of ice-nucleating agent stabilizer to the weight proportion of proteinaceous ice-nucleating agent in the indicator dispersion, the weight proportions being based upon the weight of the indicator dispersion.

16. A freeze indicator according to claim 1 comprising a weight proportion of organic material indicator particles, based upon the weight of freeze indicator dispersion, in a range selected from the group consisting of: from about 1 percent to about 50 percent; from about 5 percent to about 30 percent; from about 13 percent to about 22 percent; and from about 14.5 percent to about 17.5 percent.

17. A freeze indicator according to claim 1 comprising a weight proportion of aqueous liquid medium, based upon the weight of the indicator dispersion, in a range selected from the group consisting of: from about 50 percent to about 99 percent; from about 70 percent to about 95 percent; from about 77 percent to about 85 percent, and about 82.5 percent to about 85 percent.

18. A freeze indicator according to claim 1 comprising an indicator volume containing the indicator dispersion wherein the indicator volume has a capacity in a range selected from the group consisting of: up to about 2 mL; from about 20 µL to about 2 mL; from about 20 µL to about 150 µL; from about 40 µL to about 80 µL; and up to about 50 µL.

19. A freeze indicator according to claim 1 wherein the organic material indicator particles can coagulate to provide the irreversibly different appearance after freezing, the freeze indicator comprising:
an indicator volume containing the indicator dispersion;
at least one polymeric film member defining the indicator volume, the polymeric film member being located adjacent to the indicator dispersion and having an outer surface exposed to the ambient environment of the freeze indicator;
a viewing window for viewing the indicator dispersion; and
an attachment device for securing the freeze indicator to a host product to be monitored for possible freeze exposure.

20. A freeze indicator according to claim 19 comprising:
a substrate layer comprising the attachment device;
a viewing layer comprising the viewing window; and
a vapor-tight seal between the substrate layer and the viewing layer;
wherein the at least one polymeric film member comprises a moisture-vapor blocking material,
wherein the indicator volume is up to about 50 µL and is defined between the substrate layer and the viewing layer, and wherein the vapor-tight seal extends in a closed loop entirely around the indicator volume.

21. A freeze indicator according to claim 19 comprising a reference area proximate to the indicator volume wherein the reference area has an appearance similar to the irreversibly different appearance of the freeze indicator after freezing.

22. A freeze indicator according to claim 19 wherein the freeze indicator is flexible.

23. A freeze indicator according to claim 1 comprising:
a weight proportion of from about 5 percent to about 30 percent of the organic material indicator particles based upon the weight of indicator dispersion;
a stabilizer to stabilize the proteinaceous ice-nucleating agent; and
a stabilizer ratio of 10 or below, the stabilizer ratio being the ratio of the weight proportion of stabilizer in the indicator dispersion to the weight proportion of proteinaceous ice-nucleating agent in the indicator dispersion;
wherein the aqueous liquid medium has a pH in the range of from about 7 to about 9.

24. A freeze indicator according to claim 23 wherein the indicator dispersion comprises a volume of less than about 2 mL;
the aqueous liquid medium comprises at least about 50 percent by weight of deuterium oxide, based on the weight of the liquid medium;
the proteinaceous ice-nucleating agent comprises protein material derived from the bacterium *Pseudomonas syringae*; and
the freeze indicator can exhibit freeze onset at a temperature in the range of from about −0.9 °C. to about 0 °C. within 15 minutes of exposure to the freeze-onset temperature.

25. A freeze indicator according to claim 24 wherein the organic material indicator particles have a softness of at least about 20 dmm and comprise one or more waxy materials blended with a wax softener.

26. A freeze indicator according to claim 1 wherein the freeze indicator can exhibit freeze onset in under 30 minutes, within 15 minutes, or within 5 minutes, of exposure to the freeze-onset temperature.

27. A host product comprising a freeze indicator according to claim 1 the freeze indicator being associated with the host product to monitor the host product for freeze exposure.

28. A freeze indicator according to claim 1 wherein the aqueous liquid medium has a pH in the range of from about 7.8 to about 8.2.

29. A freeze indicator according to claim 28 comprising a stabilizer ratio of 10 or below, the stabilizer ratio being the ratio of the weight proportion of ice-nucleating agent stabilizer to the weight proportion of proteinaceous ice-nucleating agent in the indicator dispersion, the weight proportions being based upon the weight of the indicator dispersion wherein the proteinaceous ice-nucleating agent is obtained from a *Pseudomonas syringae* microorganism.

* * * * *